US006609872B2

(12) United States Patent  
Itoh

(10) Patent No.: US 6,609,872 B2  
(45) Date of Patent: Aug. 26, 2003

(54) SPECIMEN CONVEYING SYSTEM

(76) Inventor: Teruaki Itoh, 5-25, Kikaihommachi, Kumamoto-shi, Kumamoto-ken (JP)

( * ) Notice: Subject to any disclaimer, the term of this patent is extended or adjusted under 35 U.S.C. 154(b) by 98 days.

(21) Appl. No.: 09/983,509

(22) Filed: Oct. 24, 2001

(65) Prior Publication Data

US 2002/0060133 A1 May 23, 2002

(30) Foreign Application Priority Data

Oct. 31, 2000 (JP) ........................................ 2000-333958

(51) Int. Cl.[7] .............................................. B65G 47/52
(52) U.S. Cl. ........................ 414/390; 414/396; 414/398; 414/401
(58) Field of Search ................................ 414/390, 396, 414/398, 401

(56) References Cited

U.S. PATENT DOCUMENTS 4,478,329 A * 10/1984 Heiz ........................... 198/574

FOREIGN PATENT DOCUMENTS

| JP | 52-45984 | 11/1977 |
| JP | 57-005116 | 11/1982 |
| JP | 62-127741 | 8/1987 |
| JP | 2-144869 | 12/1990 |
| JP | 725448 | * 1/1995 |

* cited by examiner

Primary Examiner—Steven A. Bratlie  
(74) Attorney, Agent, or Firm—Nixon & Vanderhye

(57) ABSTRACT

A specimen conveying system includes a plurality of conveying mechanisms arranged to convey a specimen-contained container in given positions, each of the conveying mechanisms including a belt-conveyor type conveying lane, a motor-vehicle guide laid between first and second conveying mechanisms of the plurality of conveying mechanisms, and a motor vehicle guided and self-propelled by the motor-vehicle guide. The motor vehicle includes a first coupling section provided at a front of a main body of the motor vehicle and coupled to one end of the first conveying mechanism, a second coupling section provided at a rear of the main body of the motor vehicle and coupled to one end of the second conveying mechanism, and a belt-conveyor type conveying lane formed on a top surface of the motor-vehicle body and selectively connected to the belt-conveyor type conveying lanes of the first and second conveying mechanisms, thereby transferring the specimen-contained container.

6 Claims, 3 Drawing Sheets

SPECIMEN CONVEYING SYSTEM

CROSS-REFERENCE TO RELATED APPLICATIONS

This application is based upon and claims the benefit of priority from the prior Japanese Patent Application No. 2000-333958, filed Oct. 31, 2000, the entire contents of which are incorporated herein by reference.

BACKGROUND OF THE INVENTION

1. Field of the Invention

The present invention relates to a specimen conveying system including a belt-conveyor type conveying mechanism that is designed to allow a specimen-contained container to be conveyed.

2. Description of the Related Art

A specimen conveying system of this type generally includes a conveying mechanism having a belt-conveyor type conveying lane that is located within a setup area such that it can convey a specimen-contained container. The conveying mechanism is set up in a given manner according to the purpose of use. Thus, the conveying system can convey a container containing a specimen such as blood to a predetermined position. After a predetermined specimen process is completed, the conveying system can convey the container to the next processing position.

A prior art specimen conveying system is so configured that a specimen is conveyed exclusively by a conveying mechanism having a belt-conveyor type conveying lane. Thus, when a specimen processing line having a number of processing steps needs to be constructed, the conveying mechanism having a long belt-conveyor type conveying lane is set up almost all over the set-up area in a complicated manner. There are many cases where the conveying mechanism cuts off an operator's passage. Even when any special specimen processing is not performed halfway in the conveying line but the specimen is simply moved to a remote location, the conveying mechanism having a belt-conveyor type conveying lane has to be provided.

BRIEF SUMMARY OF THE INVENTION

An object of the present invention is to provide a specimen conveying system having the following advantages:

(a) An operator's passage can be hardly cut off by the conveying mechanism having a long conveying lane.

(b) An inefficient conveying mechanism used exclusively for simply conveying a specimen can be eliminated.

In order to attain the above object, the specimen conveying system according to the present invention has the following characteristic configuration. The other characteristic configurations will be clarified in the embodiment later.

A specimen conveying system according to an aspect of the present invention comprises a plurality of conveying mechanisms arranged to convey a specimen-contained container and separated from each other in given positions, each of the conveying mechanisms including a belt-conveyor type conveying lane, a motor-vehicle guide laid between first and second conveying mechanisms of the plurality of conveying mechanisms, and a motor vehicle guided and self-propelled by the motor-vehicle guide, the motor vehicle including a first coupling section provided at a front of a main body of the motor vehicle and coupled to one end of the first conveying mechanism, a second coupling section provided at a rear of the main body of the motor vehicle and coupled to one end of the second conveying mechanism, and a belt-conveyor type conveying lane formed on a top surface of the main body of the motor vehicle and selectively connected to the belt-conveyor type conveying lanes of the first and second conveying mechanisms, thereby transferring the specimen-contained container.

DETAILED DESCRIPTION OF THE INVENTION

Embodiment

Figure 1:
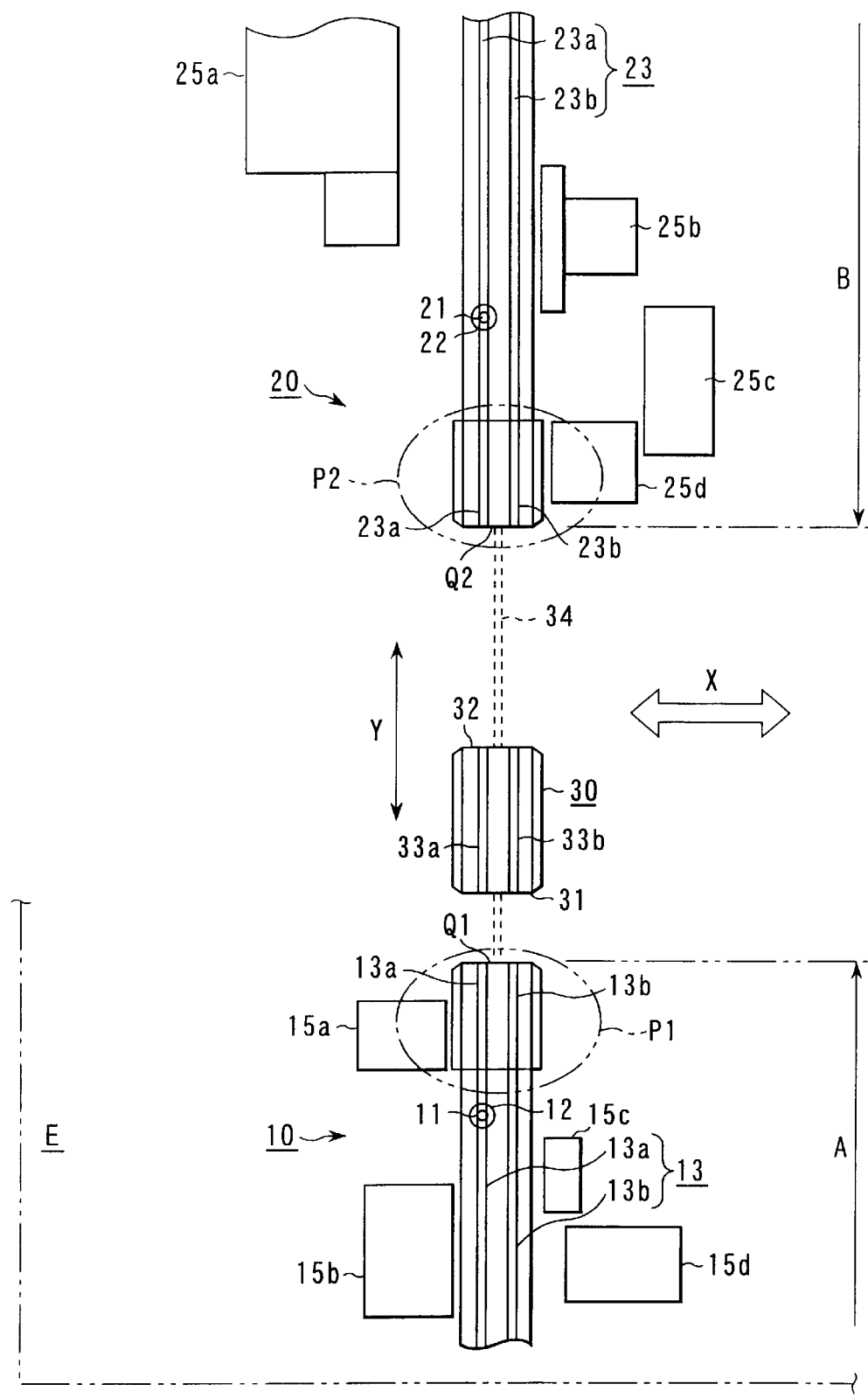
FIG. 1 is a schematic plan view showing a configuration of a specimen conveying system according to an embodiment of the present invention.

The specimen conveying system shown in FIG. 1 comprises a plurality of conveying mechanisms (two conveying mechanisms 10 and 20 are shown in FIG. 1) in a setup area E. The conveying mechanisms 10 and 20 are vertically separated from each other and arranged in their respective regions A and B.

The first conveying mechanism 10 is so designed that belt-conveyor type conveying lanes 13a and 13b can convey a specimen holder 12 for holding a specimen-contained container 11 such as a test tube containing a specimen such as blood.

The second conveying mechanism 20 is so designed that belt-conveyor type conveying lanes 23a and 23b can convey a specimen holder 22 for holding a specimen-contained container 21 such as a test tube containing a specimen such as blood.

A motor-vehicle guide 34 is laid between one end P1 of the first conveying mechanism 10 and one end P2 of the second conveying mechanism 20 to guide a motor vehicle 30 such that the vehicle is self-propelled. As the motor-vehicle guide 34, a tag having memory elements is buried into the floor surface along a running route. The motor vehicle 30 includes a sensor for sensing a position of the tag and can be self-propelled in the direction of arrow Y by the motor-vehicle guide 34.

In FIG. 1, reference numerals 15a to 15d denote different specimen processing units arranged around the first conveying mechanism 10, while numerals 25a to 25d denote different specimen processing units arranged around the second conveying mechanism 20.

Figure 2:
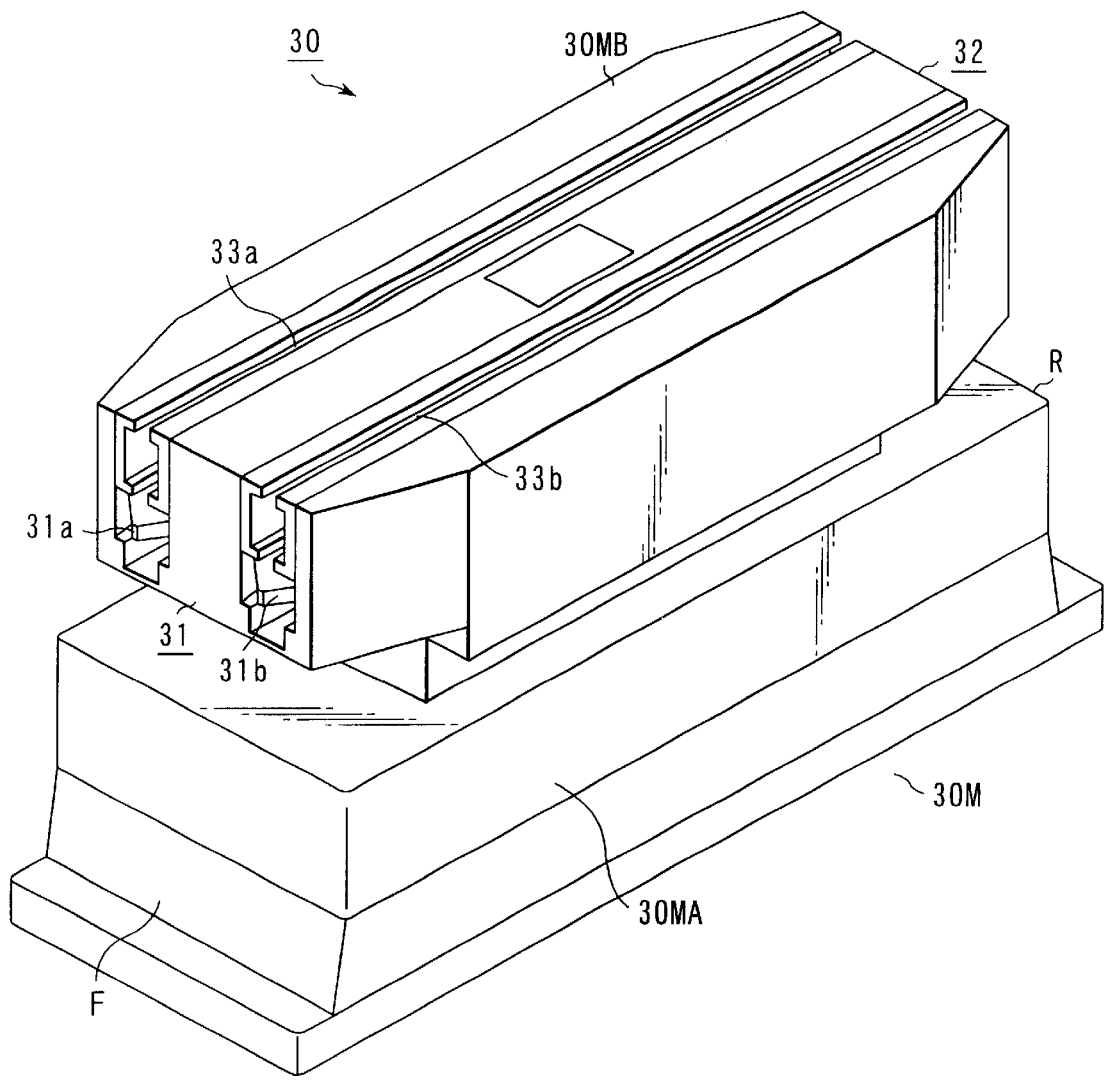
FIG. 2 is a perspective view showing a structure of a motor vehicle of the specimen conveying system according to the embodiment of the present invention.

FIG. 2 is a perspective view of the structure of the motor vehicle 30. As FIG. 2 illustrates, the motor vehicle 30 includes a motor-vehicle body 30M having a truck section 30MA and a conveyance section 30MB mounted on the truck section 30MA. The motor-vehicle body 30M includes the following mechanisms.

A first coupling section 31 (31a, 31b) is provided at the front F of the motor vehicle body 30M (specifically the front of the conveyance section 30MB). The first coupling section 31 (31a, 31b) is detachably coupled to a coupling section Q1 at the end P1 of the first conveying mechanism 10.

A second coupling section 32 is provided at the rear of the motor vehicle body 30M (specifically the rear of the conveyance section 30MB). The second coupling section 32 is detachably coupled to a coupling section Q2 at the end P2 of the second conveying mechanism 20.

A pair of belt-conveyor type conveying lanes 33a and 33b are arranged in parallel on the flat top surface of the motor vehicle body 30M (specifically the top surface of the conveyance section 30MB). Like the belt-conveyor type conveying lanes of the first and second conveying mechanisms 10 and 20, the pair of conveying lanes 33a and 33b is so configured that they can convey a specimen holder (not shown) that holds a specimen-contained container.

The end portions of the conveying lanes 33a and 33b, on the first coupling section 31, are connected to the conveying lanes 13a and 13b of the first conveying mechanism 10 when the first coupling section 31 is coupled to the coupling section Q1 at the end P1 of the first conveying mechanism 10.

The end portions of the conveying lanes 33a and 33b, on the second coupling section 32, are connected to the conveying lanes 23a and 23b of the second conveying mechanism 20 when the second coupling section 32 is coupled to the coupling section Q2 at the end P2 of the second conveying mechanism 20.

Thus, the pair of conveying lanes 33a and 33b can transfer the specimen-contained container.

Figure 3:
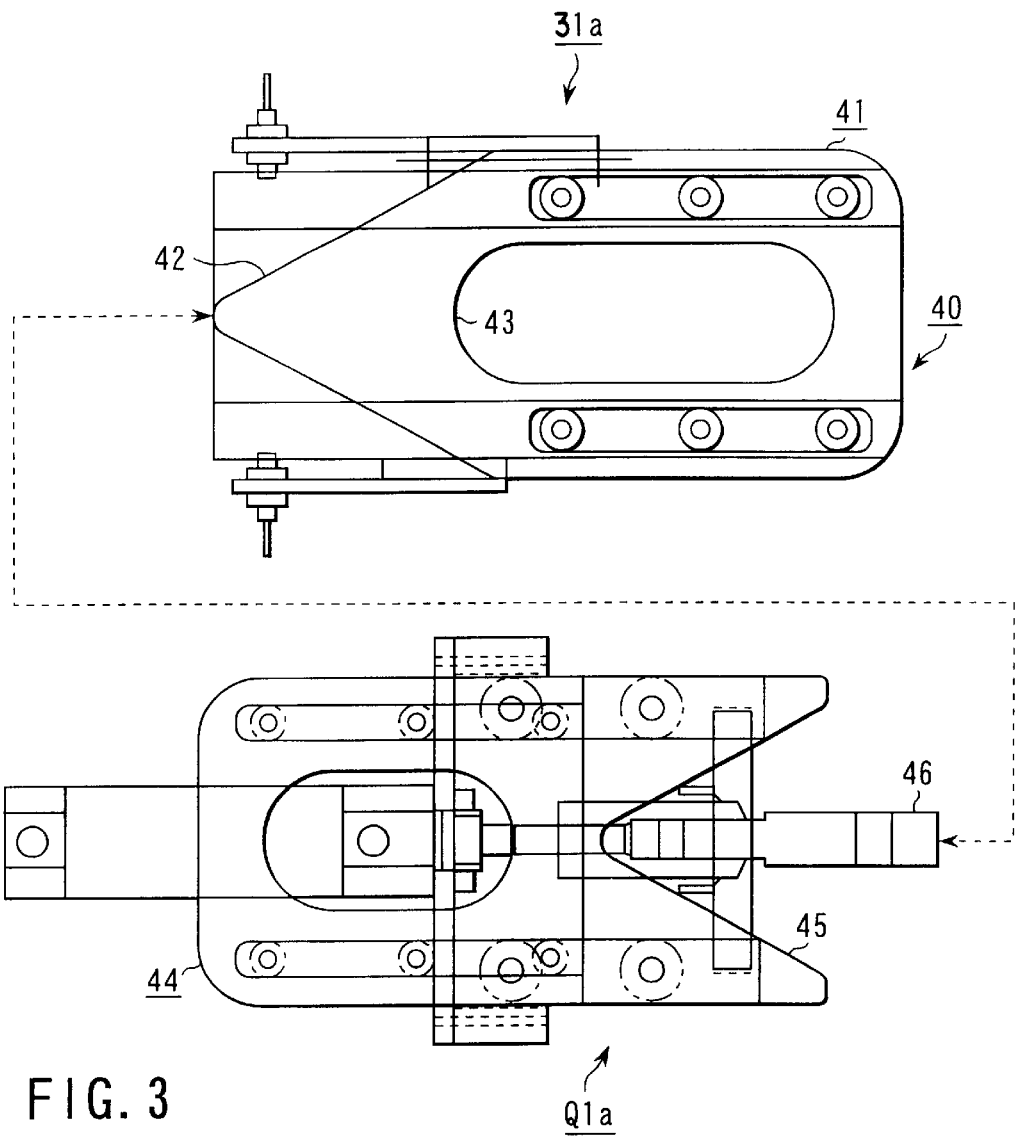
FIG. 3 is a plan view showing a structure of coupling a first coupling section of the motor vehicle and a coupling section of a first conveying mechanism in the specimen conveying system according to the embodiment of the present invention.
Figure 4:
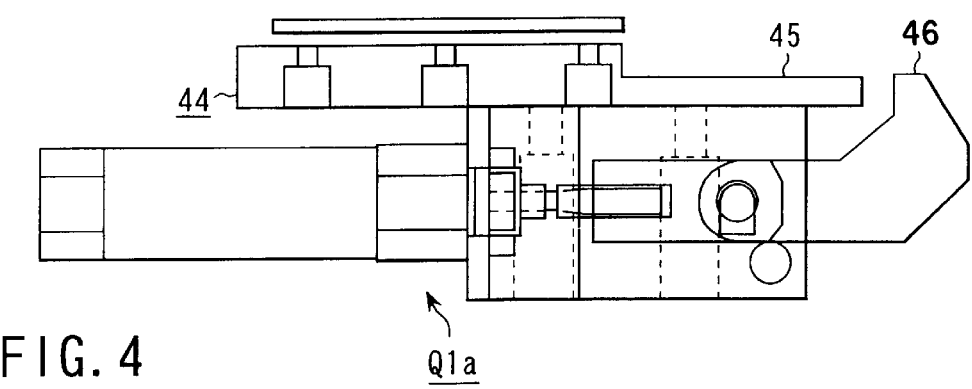
FIG. 4 is a side view showing a structure of a coupling section of a first coupling mechanism of the specimen conveying system according to the embodiment of the present invention.

FIG. 3 is a plan view showing a structure for coupling the first coupling section 31 (only 31a is shown) of the motor vehicle 30 and the coupling section Q1 (only Q1a corresponding to 31a is shown) of the first conveying mechanism 10. FIG. 4 is a side view showing a structure of the coupling section Q1 (only Q1a corresponding to 31a is shown) of the first coupling mechanism 10.

As FIGS. 3 and 4 illustrate, the first coupling section 31a and the coupling section Q1a are detachably coupled to each other by a hooked coupling means 40. The first coupling section 31a includes at least a plate-shaped substrate 41, an angular inserting portion 42 projected from one end (left side of FIG. 3) of the substrate 41, and an oval fitting hole 43 formed in the central part of the substrate 41. On the other hand, the coupling section Q1a includes at least a plate-shaped substrate 44, a V-shaped recess portion 45 formed at one end (right side of FIG. 3) of the substrate 44, and a movable hook 46 whose end is attached to the substrate 44. The hook 46 can be rocked up and down.

Thus, when the first coupling section 31a of the motor vehicle 30 contacts the coupling section Q1a at the end P1 of the first conveying mechanism 10, the angular inserting portion 42 slides into the V-shaped recess portion 45 to position both the coupling sections. Then, the oval fitting hole 43 of the first coupling section 31a is fitted to the movable hook 46 of the coupling section Q1a. Both the coupling sections are therefore coupled integrally as one component in such a manner that they cannot separate from each other. In order to separate them, the movable hook 46 has only to be depressed to reverse the motor vehicle 30.

According to the embodiment of the present invention, the motor vehicle 30 is used; therefore, as shown in FIG. 1, an operator can cross a space between the first and second conveying mechanisms 10 and 20 in the directions of arrow X and the space can be used as a passage. Consequently, an operator's passage can be hardly cut off by the conveying mechanism having a long belt-conveyor type conveying lane. Further, the use of the motor vehicle 30 allows an inefficient conveying mechanism used exclusively for simply conveying a specimen to be eliminated.

Modifications

The specimen conveying system according to the embodiment can be modified as follows.

i) A plurality of motor vehicles are caused to run between three or more conveying mechanisms.

ii) The motor-vehicle guide curves at right angles or like an arch.

What is claimed is:

1. A specimen conveying system comprising:

a plurality of conveying mechanisms arranged to convey a specimen-contained container and separated from each other in given positions, each of the conveying mechanisms including a belt-conveyor type conveying lane;

a motor-vehicle guide laid between first and second conveying mechanisms of the plurality of conveying mechanisms; and a motor vehicle guided and self-propelled by the motor-vehicle guide, the motor vehicle including:

a first coupling section provided at a front of a main body of the motor vehicle and coupled to one end of the first conveying mechanism;

a second coupling section provided at a rear of the main body of the motor vehicle and coupled to one end of the second conveying mechanism; and a belt-conveyor type conveying lane formed on a top surface of the main body of the motor vehicle and selectively connected to the belt-conveyor type conveying lanes of the first and second conveying mechanisms, thereby transferring the specimen-contained container.

2. A specimen conveying system comprising:

a plurality of conveying mechanisms arranged to convey a specimen-contained container and separated from each other in given positions, each of the conveying mechanisms including a belt-conveyor type conveying lanes;

a motor-vehicle guide laid between first and second conveying mechanisms of the plurality of conveying mechanisms; and a motor vehicle guided and self-propelled by the motor-vehicle guide, the motor vehicle including:

a motor-vehicle main body;

a first coupling section provided at a front of the motor-vehicle main body and detachably coupled to a coupling end of the first conveying mechanism;

a second coupling section provided at a rear of the motor-vehicle main body and detachably coupled to a coupling end of the second conveying mechanism; and a pair of conveying lanes formed in parallel on a flat top surface of the motor-vehicle main body, ends of the pair of conveying lanes being connected to a pair of conveying lanes of the first conveying mechanism when the first coupling section is coupled to the coupling end of the first conveying mechanism, and other ends of the pair of conveying lanes being connected to a pair of conveying lanes of the second conveying mechanism when the second coupling section is coupled to the coupling end of the second conveying mechanism, thereby transferring the specimen-contained container.

3. The specimen conveying system according to claim 2, wherein the pair of conveying lanes are belt-conveyor type conveying lanes.

4. The specimen conveying system according to claim 1, wherein the first and second coupling sections are each detachably coupled to a coupling section of one end of each of the conveying mechanisms through a hooked coupling means.

5. The specimen conveying system according to claim 2, wherein the first and second coupling sections are each detachably coupled to a coupling section of one end of each of the conveying mechanisms through a hooked coupling means.

6. The specimen conveying system according to claim 3, wherein the first and second coupling sections are each detachably coupled to a coupling section of one end of each of the conveying mechanisms through a hooked coupling means.

* * * * *